US006806295B2

(12) United States Patent
Hu

(10) Patent No.: US 6,806,295 B2
(45) Date of Patent: *Oct. 19, 2004

(54) SOL-GEL PROCESSING WITH INORGANIC METAL SALT PRECURSORS

(75) Inventor: Zhong-Cheng Hu, Knoxville, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 09/397,814

(22) Filed: Sep. 17, 1999

(65) Prior Publication Data

US 2002/0120016 A1 Aug. 29, 2002

(51) Int. Cl.[7] .............................. B01F 3/12; C01G 25/02
(52) U.S. Cl. .............................. 516/22; 516/33; 516/34; 516/90; 423/21.1; 423/65; 423/85; 423/92; 423/122; 423/338
(58) Field of Search ............................... 516/22, 90, 33, 516/34; 423/21.1, 85, 65, 92, 122, 338

(56) References Cited

U.S. PATENT DOCUMENTS

| 5,030,608 A | * | 7/1991 | Schubert et al. ............ 502/300 |
| 5,037,579 A | * | 8/1991 | Matchett ...................... 516/90 |
| 5,846,511 A | * | 12/1998 | Kim et al. ................... 423/610 |
| 6,264,912 B1 | * | 7/2001 | Hu ............................... 423/593 |

FOREIGN PATENT DOCUMENTS

JP 09 002818 * 1/1997

OTHER PUBLICATIONS

Derwent Abstract on East, week 200015, London: Derwent Publications Ltd., AN 1997–115099, JP 09002818 A, (Kankoku Kagaku), abstract.*

Machine translation of JP 09 002818, Japan Patent Office, http://www6.ipdl.jpo.go.jp/Tokujitu/PAJdetail.ipdl?N0000=60&N0120=01&N2001=2&N3001=H09–002818, (May–2003), 9 pages.*

Bleier, A. et al. "Nucleation and Growth of Uniform m–$ZrO_2$," *Mat. Res. Soc. Symp. Proc.* 73:71–78 (1986), month unknown.

Jaeger, R. E. et al., "Preparation of Ceramic Oxide Powders by Liquid Drying," *Ceramic Bulletin* 53(12):855–859 (1974), month unknown.

O'Toole, M. P. et al. "$Y_2O_3$–$ZrO_2$ Powder Synthesis via Alcohol Dehydration of Aqueous Salt Solutions," *Ceramic Bulletin* 66(10): 1486–1489 (1987), month unknown.

Moon, Y.–T. et al. "Preparation of Monodisperse and Spherical Zirconia Powders by Heating of Alcohol–Aqueous Salt Solutions," *J. Am. Ceram. Soc.* 78(10):2690–2694 (Oct. 1995).

Moon, Y.–T. et al. "Preparation of Monodisperse and Spherical Zirconia Powders by Heating of Alcohol–Aqueous Salt Solutions," *J. Am. Ceram. Soc.* 78(4):1103–1106 (1995), month unknown.

Hu, M. Z.–C. et al., *J. Mater. Res.* 14(1):103–113 (1999), month unknown.

Hu, M. Z.–C. et al., *J. Colloid Interface Sci.* 198:87–99 (Feb. 1998).

(List continued on next page.)

*Primary Examiner*—Daniel S. Metzmaier
(74) *Attorney, Agent, or Firm*—Kilpatrick Stockton LLP

(57) ABSTRACT

Methods for sol-gel processing that generally involve mixing together an inorganic metal salt, water, and a water miscible alcohol or other organic solvent, at room temperature with a macromolecular dispersant material, such as hydroxypropyl cellulose (HPC) added. The resulting homogenous solution is incubated at a desired temperature and time to result in a desired product. The methods enable production of high quality sols and gels at lower temperatures than standard methods. The methods enable production of nanosize sols from inorganic metal salts. The methods offer sol-gel processing from inorganic metal salts.

24 Claims, 11 Drawing Sheets

OTHER PUBLICATIONS

Hench, L. L. and J. K. West "The Sol–Gel Process." *Chem. Rev.* 90, 33–72 (1990), month unknown.

Livage, J. "The Sol–Gel Route to Advanced Materials," *Materials Science Forum* 152–153, 43–54 (1994), month unknown.

Pierre, A. C. "Sol–Gel Processing of Ceramic Powders," *Ceramic Bulletin* 70, 1281–1288 (1991), month unknown.

Park, H. K., Kim, D. K., and Kim, C. H., *J. Am. Ceram. Soc.* 80, 743 (1997), month unknown.

Wang, M.–L., Liu, B.–L., Ren, C.–C., and Shih, Z.–W., *Ind. Eng. Chem. Res.* 36, 2149 (1997), month unknown.

Hamada, S., Niizeki, S., and Kudo, Y., *Bull. Chem. Soc. Jpn.* 59, 3443 (1986), month unknown.

* cited by examiner

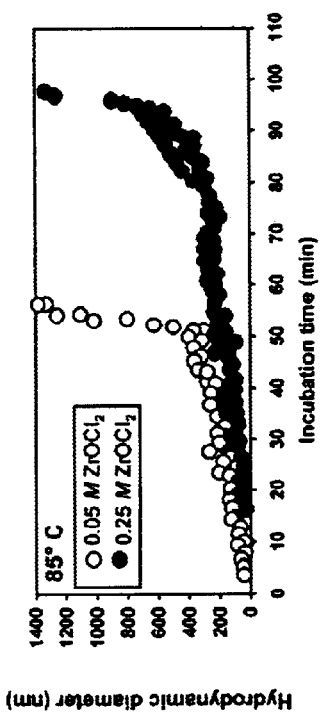
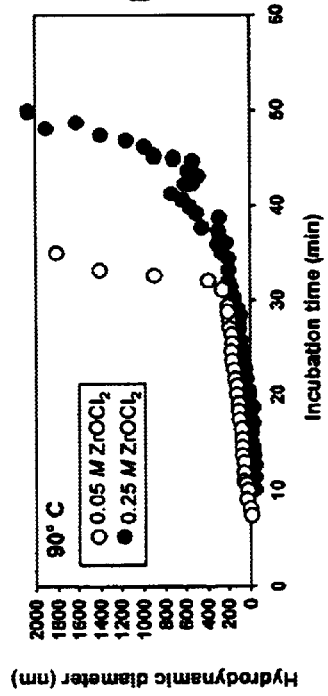
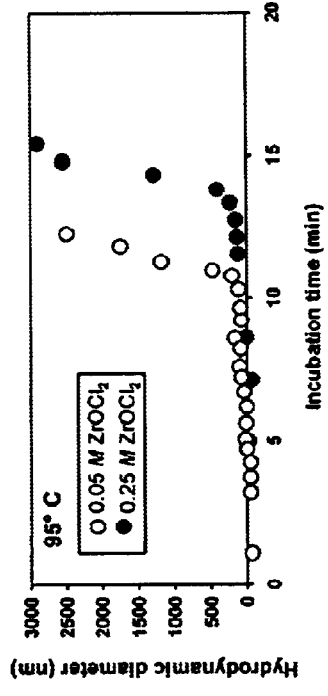
Figure 6A
Figure 6B
Figure 6C

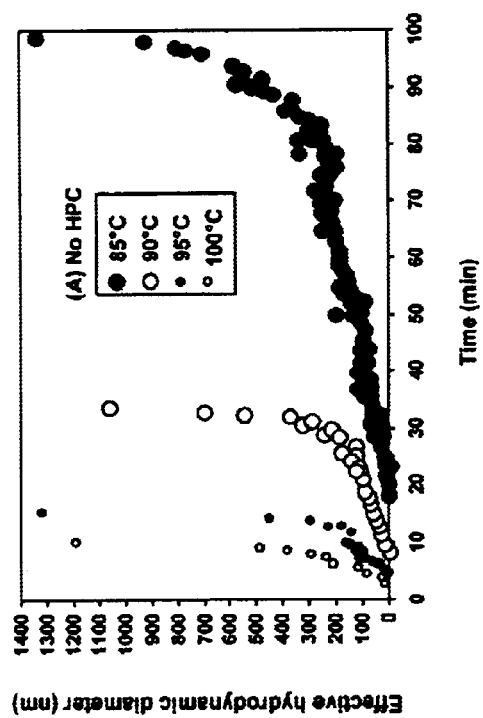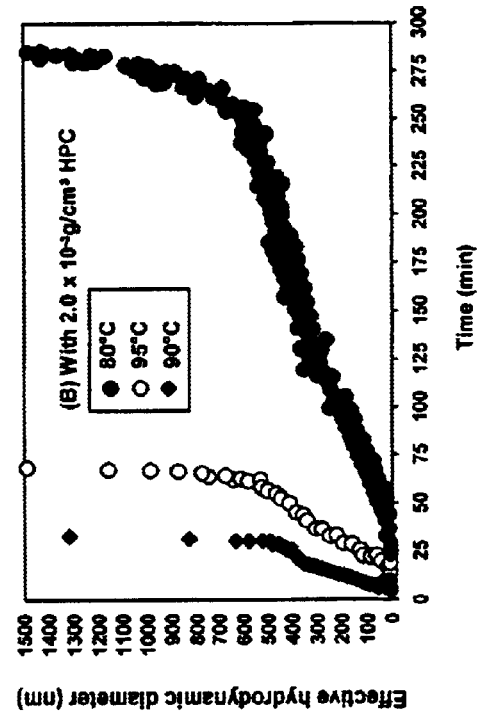

SOL-GEL PROCESSING WITH INORGANIC METAL SALT PRECURSORS

STATEMENT REGARDING GOVERNMENT RIGHTS

This invention was made with Government support under Contract No. DE-AC05-96OR22464 awarded by the U.S. Department of Energy to Lockheed Martin Energy Research Corp., and the Government has certain rights in this invention.

TECHNICAL FIELD

The invention relates to methods for the synthesis of ultrafine oxide particles or gels from an inorganic metal salt.

BACKGROUND OF THE INVENTION

Ultrafine oxide powders, also referred to as sols when they are in a colloidal stable suspension, and gels are important building blocks for structural and functional materials, such as advanced ceramics and alloys for structural, thermal, optical, catalytic, separations, and electronic applications. Particle quality in terms of size, size distribution (monodispersity), chemical homogeneity/purity, and morphology (state of agglomeration and shape of primary particles) directly affects later-stage ceramic processing (such as sintering) as well as physical/chemical properties of the final products. Nanosized or nanostructured building block materials are strongly needed for fabricating so-called nanophase materials that have dramatically improved properties relative to the coarse-grained materials. Sol-gel processes produce coatings and films that exhibit unique properties suitable for various applications.

Currently, there is a strong need for more efficient and economical methods of production of high-quality inorganic particles. The primary technologies for synthesis of ultrafine particles are wet chemical synthesis, such as sol-gel processing, and gas-phase condensation. Gas-phase reactions typically require extreme conditions such as high vacuum and high temperature and give very slow particle production rates.

In sol-gel processes, a molecular precursor in a homogenous solution undergoes a succession of transformations: a) hydrolysis of the molecular precursor; b) polymerization via successive bimolecular additions of ions, forming oxo-, hydroxyl, or aqua bridges; c) condensation by dehydration; d) nucleation; and e) growth. Molecular precursors include a cation of a metal, in the form of an ionized inorganic species, such as a salt, or in the form of nonionized organometallic molecule, such as an alkoxide.

Alkoxide compounds have been used as the molecular precursors in most of the currently used or suggested sol-gel processes for synthesis of ceramic powders, films, coatings, and monoliths. However, alkoxides are too expensive for some applications. Moreover, the rapid reaction rate typically exhibited by alkoxides renders the reactions difficult to control. Further, the use of organic elements often results in organic contaminants that must be burned away at high temperatures. Typically, methods that utilize inorganic salts as precursors for wet chemical or solution synthesis include forced hydrolysis or hydrothermal processing, which usually requires relatively high temperatures of 100 to 200° C. or higher to induce hydrolytic reactions, condensation and the resulting evolution of solid-phase particles. Nanosize hydrous zirconium oxide particles have been produced successfully by the forced hydrolysis although the process kinetics is relatively slow. Bleier, A. et al. "Nucleation and Growth of Uniform m-$ZrO_2$," *Mat. Res. Soc. Symp. Proc.* 73:71–78 (1986).

Little work has been reported utilizing an inorganic metal salt and an organic solvent, such as an alcohol, together in materials synthesis and processing. For preparation of ceramic oxide powders, a "liquid drying" process has been reported, in which an alcohol solvent was used as a hygroscopic liquid for the dehydration of an aqueous solution of a metal salt. The method involves spraying or atomizing the aqueous solution of a metal salt into the vortex of a swirling bath of hygroscopic liquid. The drying liquid rapidly removes water from the salt solution droplets while the remaining metal salts coprecipitate forming a powder. Jaeger, R. E. et al., "Preparation of Ceramic Oxide Powders by Liquid Drying," *Ceramic Bulletin* 53(12):855–859 (1974); and O'Toole, M. P. et al. "$Y_2O_3$-$ZrO_2$ Powder Synthesis via Alcohol Dehydration of Aqueous Salt Solutions," *Ceramic Bulletin* 66(10): 1486–1489 (1987). The quality in terms of particle size monodispersity and particle shape uniformity of the powders produced in these methods is poor.

A process has been reported for production of hydrous oxide particles using a mixed aqueous/organic solvent and inorganic metal salt. However, the process is not a sol-gel process and the hydrous oxide particles are not nanosize. The process focuses only on ceramic powder production and the powder particle size was relatively large (from submicrons to a few microns). Moon, Y. -T. et al. "Preparation of Monodisperse and Spherical Zirconia Powders by Heating of Alcohol-Aqueous Salt Solutions," *J. Am. Ceram. Soc.* 78(10):2690–2694 (1995).

Accordingly, what is needed is more efficient and economical methods of producing nanosized particles. What is needed is methods of producing sols and gels from inorganic metal salts at room temperature. What is also needed is methods of sol-gel processing using inorganic metal salts.

SUMMARY OF THE INVENTION

The present invention is directed to methods for sol-gel processing using inorganic metal salts.

The present invention also is directed to methods for producing nanosize sol particles from inorganic metal salts.

The present invention is further directed to methods for producing sols from inorganic metal salts at room temperature.

The present invention is also directed to particles, sols, and gels produced according to the methods described herein.

The present invention is further directed to articles made from sols and gels made according to the methods described herein.

The methods generally involve mixing together an inorganic metal salt, water, and a water miscible alcohol or other organic solvent, preferably at room temperature. A macromolecular dispersant material, such as hydroxypropyl cellulose (HPC), may optionally be added. The resulting homogenous solution is incubated at a temperature from about 20° C. to 150° C., preferably about 22° C. to about 120° C., for a period of time between about 1 minute to 72 hours, preferably about 1 to 48 hours. The mixture turns milky as the incubation proceeds. After incubation, the solution is optionally neutralized by titration with ammonia ($NH_4OH$), for example, to prevent dissolution. Solids can be collected, such as by filtration or centrifugation, and optionally washed with deionized water.

Several parameters of the method can be manipulated, making the method highly tunable, and enabling production of sols and gels with various desired characteristics. For example, variables that can be tightly controlled and which control the product characteristics include the metal salt concentration (C), ratio of organic solvent to water (RH), temperature of incubation (T), time of incubation (t), and concentration of macromolecular dispersant (such as HPC).

The methods enable production of high quality sols and gels at lower temperatures than standard methods. The methods enable production of nanosize sols, having a diameter from about 10 nm to about 200 nm, preferably less than about 100 nm, from inorganic metal salts. The methods offer sol-gel processing from inorganic metal salts.

BRIEF DESCRIPTION OF THE DRAWINGS

FIG. 6 illustrates the effects of temperature and initial salt concentration on particle growth. (C) was 0.05 (filled circles) or 0.025 M (open circles), RH was 1/1, and T was 85, 90, and 95° C., respectively for FIGS. 6A, 6B, and 6C.

FIG. 8 illustrates the effect of HPC and temperature on nucleation and growth. In FIG. 8A (C) was 0.05 M, RH was 1/1, and T was 85° C. (filled circles), 90° C. (open circles), 95° C. filled hexagons), or 100° C. (open hexagons). In FIG. 8B, (C) was 0.05 M, RH was 1/1, and T was 80° C. (filled circles), 85° C. (open circles), or 90° C. (filled diamonds), and HPC was used at $2.0 \times 10^{-3}$ g/cm$^3$.

DETAILED DESCRIPTION OF THE INVENTION

Figure 1:
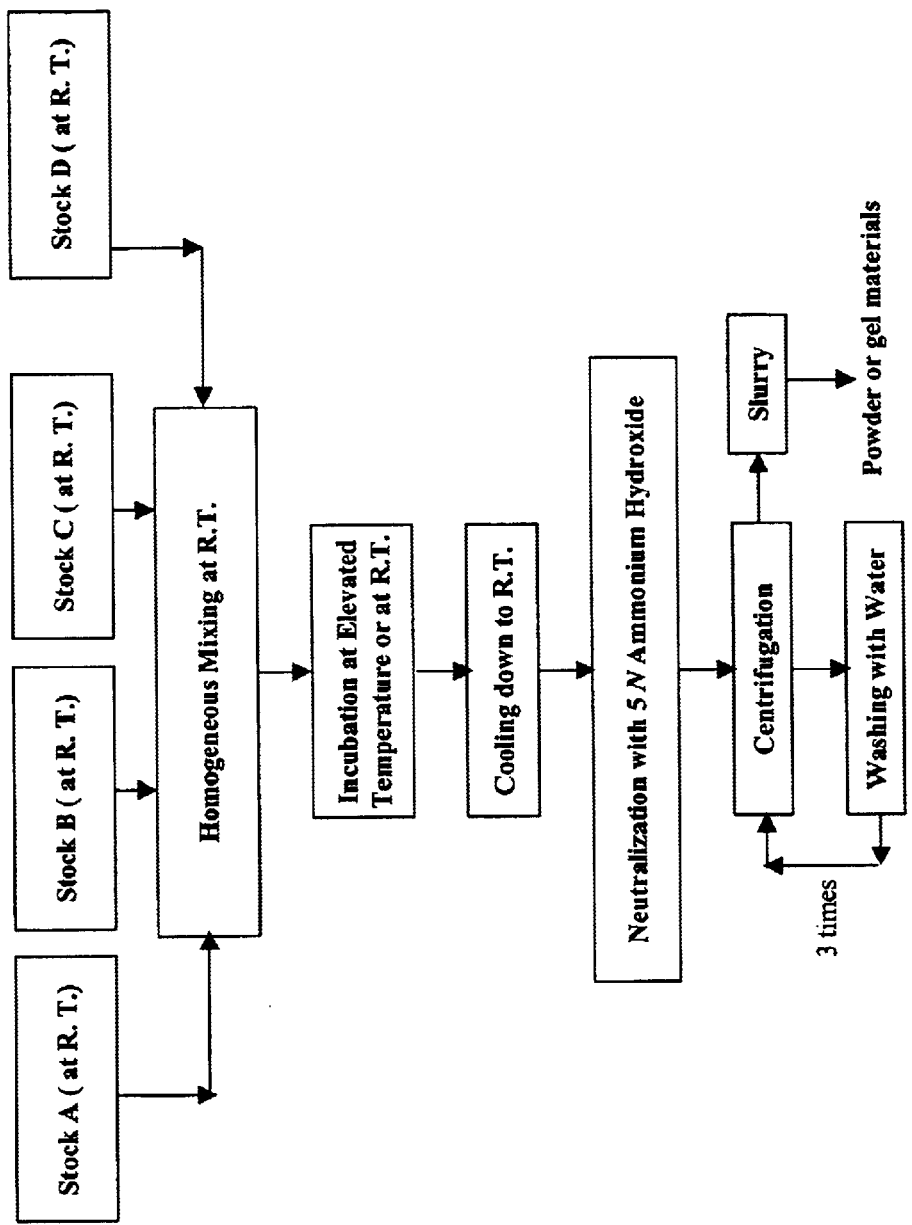
FIG. 1 is a schematic illustrating one embodiment of the general method of the invention.

The present invention is methods for production of sols and gels from inorganic metal salts. Nanosize particles can be produced. Sols can be produced at room temperature. The methods offer sol-gel processing to produce a wide variety of materials of high quality.

A wet chemical (sol-gel) processing route is provided for the controlled synthesis of ultrafine oxide particles or gels, which are in high demand for, inter alia, development of advanced ceramics. The method utilizes homogeneous nucleation and growth phenomena in inorganic salt solutions of mixed solvents (such as water and an alcohol). The sol-gel processes in the mixed solvent system are tunable by adjusting the processing parameters, including initial inorganic metal salt concentration (C), alcohol/water ratio (RH), incubation temperature (T), incubation time (t), concentration of dispersant, such as hydroxypropyl cellulose (HPC), and neutralization, such as with ammonia. Submicron and nanoscale (less than 100 nm) monodispersed hydrous metal oxide microspheres/powders can be successfully synthesized under conditions of high RH ratio, using HPC (MW 100,000, $2.0 \times 10^{-3}$ g/cm$^3$) and ammonia neutralization. Gel materials can be obtained under conditions of low RH.

Comparison of Methods With and Without Mixed Solvent

In aqueous solutions of $ZrOCl_2$ that do not contain any organic solvent, the zirconium exists in the form of tetramers (at low pH, less than about 1.5) or octamers (at higher pH, greater than about 1.5). Hu, M. Z. -C. et al., *J. Mater. Res.* 14(1):103–113 (1999). Thermal incubation at elevated temperature (from 90 to 120° C. or higher) induces forced hydrolysis and condensation of zirconium tetramers, forming nanosized, cube-shaped monoclinic zirconia particles. Hu, M. Z. -C. et al., *J. Colloid Interface Sci.* 198:87–99 (1998); Bleier, A. et al., "Nucleation and Growth of Uniform m-$ZrO_2$," *Mat. Res. Soc. Symp. Proc.* 73, 71–78 (1986). The forced hydrolysis process is slow in producing particles; it usually took a few days for the complete conversion from soluble zirconium species to solid nanoparticles.

The particle nucleation and growth processes of inorganic metal salt solutions in mixed (water-alcohol) solvents using the methods described herein are different from those observed using corresponding alcohol-free solutions. The differences are summarized in Table 1.

TABLE 1

Differences between methods with and without alcohol.

| Comparison parameters | Mixed Solvent Synthesis with Alcohol | Aqueous solutions without alcohol |
|---|---|---|
| Particle shape | perfect sphere | cube |
| Particle microstructure after synthesis | amorphous (dense) | monoclinic (porous aggregates) |
| Particle size and uniformity | nanoscale to a few microns, monodispersed | nanoscale to submicrons (<about 300 nm), narrowly distributed |
| Gel formation | can be achieved | no |
| Processing temperature requirement | low (typically R.T. to 100° C.) | relatively high (realistically, greater than 95° C.) typically 100 to 200° C. |
| Nucleation and growth mechanism | Homogeneous precipitation due to creation of supersaturation in low dielectric medium. | Forced hydrolysis and condensation of polymerized zirconium species. |

TABLE 1-continued

Differences between methods with and without alcohol.

| Comparison parameters | Mixed Solvent Synthesis with Alcohol | Aqueous solutions without alcohol |
|---|---|---|
| Process kinetics | rapid, easily tunable (incubation time as low as a few minutes) | slow (typical incubation time one to a few days) |

Water solutions of a metal salt such as $ZrOCl_2$ are usually stable at room temperature, both thermodynamically and kinetically. The dielectric constant for water is high (87.9 at 25° C.). However, most of the other organic solvents such as alcohols have much lower dielectric constants. When an alcohol solvent is mixed with a metal salt water solution, the dielectric constant of the background solvent medium (i.e. the mixture of water and alcohol) decreases. The higher the alcohol concentration in the mixture, the lower the dielectric constant becomes, and correspondingly the lower the solubility of the solute (i.e. the inorganic metal salt) is in the mixed solvent. Uniform mixing of the alcohol and the aqueous solution containing inorganic metal salt creates a supersaturation of metal ionic species in the newly formed mixed solvent environment. The supersaturation of solute (i.e. molecules or polymeric clusters) is the driving force for the nucleation and growth of solid-phase hydrous zirconia particles. On the other hand, a change in dielectric constant also alters the interparticle forces between colloids and their aggregative growth. Homogeneous precipitation (with controlled nucleation and growth) can be induced upon addition of an alcohol to a metal salt aqueous solution.

Simply considering the dielectric effect of the alcohol, there is no apparent reason to use an elevated temperature (above room temperature) to induce homogeneous precipitation. Nevertheless, temperature variation in a controlled manner can help to fine-tune the dielectric properties of the mixed alcohol-water. The higher the temperature, the lower the dielectric constant of the mixed solvent. Madelung, O., "Numerical Data and Functional Relationships in Science and Technology," Landolt-Börnstein New Series IV/6, New York, 1996.

On the other hand, if the temperature is high enough above a critical value, it may activate hydrolytic condensation and thus the formation of larger hydrolytic polymeric species (such as zirconium octamer or oligomer formation from tetramers), which have lower solubility in the mixed solvent. Thus, large-molecular-weight zirconium species formation due to hydrolytic condensation may give another explanation as to why higher temperature conditions correspond to faster particle precipitation kinetics. When the alcohol concentration is high enough (such as RH 5/1) in the mixture, the solubility of solute species is low in the mixed solvent and the kinetics of the nucleation and growth is fast. Thus, elevated temperature is not necessary for precipitation to occur.

I. Definitions

The following terms have the following definitions as used in the specification and claims.

A "sol-gel process" or "sol-gel processing" refers to homogenous nucleation and growth of a sol or polymer in a liquid medium that forms a uniform powder or gel after drying.

A "sol" refers to discrete units of solid material dispersed in a liquid.

A "gel" refers to a single three-dimensional network spreading through a liquid matrix or a dried network structure.

The "gelling point" refers to the time when dramatic agglomeration or particle connection occurs.

"Monodispersed" refers to particles having a narrow size distribution range about the average particle size, such as about 15%.

"Polymerization" refers to the result of covalent crosslinking of molecular species.

"Nucleation" refers to the first statistical and unstable association of the polynuclear species in solution to form nuclei.

"Growth" refers to a stable size increase of the nuclei.

"Critical radius" or "r*" refers to the maximum radius of a particle of a certain polynuclear species.

"Nuclei" refers to particles having a radius, r, above the critical radius, r*.

"Embryo" refers to unstable particles having a radius lower than r*.

"Dissolution" refers to dispersion of particles into solution.

II. Compositions

Metal Salt

The methods are applicable for production of sols and gels from many metals such as aluminum, hafnium, silicon, zirconium, titanium, lanthanum, germanium, and tantalum, among others, by means of inorganic salts, e.g. nitrates, sulfates, sulfides, and chlorides of the same elements. Combinations of metals and salts can also be used. The concentration of the metal salt can range from about 0.005 M to about 0.5 M, more preferably from about 0.025 M to 0.02 M. The effects of different concentrations of the metal salt are discussed further below.

Organic Solvent

Solvents that can be used include methanol, ethanol, isopropanol, n-propanol, tert butyl alcohol, n-butanol, acetone, and glycerol. Lower alcohols having 1 to 4 carbons are preferred. A preferred organic solvent is isopropanol. The amount of organic solvent is expressed herein as a ratio of organic solvent to water, or RH. For example a ratio of 5/1 refers to five parts organic solvent to one part water. The ratio can range from about 0.1/1 to 10/1, more preferably from about 0.5/1 to 5/1. The effects of different amounts of the organic solvent are discussed further below. A low RH typically refers to a ratio of less than 2. A high RH typically refers to a ratio greater than 4.

Dispersant

Dispersants that can be used in the method include hydroxypropyl cellulose (HPC), polyvinyl alcohol, and other compounds commonly used as dispersants. The amount of dispersant can range from zero to about $10^{-2}$ $g/cm^3$. A commonly used amount of dispersant is $2.0 \times 10^{-3}$ $g/cm^3$. The effects of different concentrations of the dispersant are discussed further below.

Neutralizing Agent

Ammonia ($NH_4OH$) is one neutralizing agent that can be used. Others are potassium hydroxide and sodium hydroxide. The neutralizing agent is typically used in an amount to stabilize the formed particles, which will generally be an amount to change the pH of the solution to about 6 to 8, preferably about 7.0. The effects of using neutralizing agents are discussed below.

III. Methods for Making Gels and Sols

The General Method

One embodiment of a general scheme of the method is illustrated by FIG. 1. Stock A is an aqueous solution of the metal salt. Stock B is an aqueous solution of the dispersant. Stock C is deionized water. Stock D is an organic solvent. The concentrations of the stock solutions A and B depend upon convenience and solubility of the metal salt and dispersant, respectively.

Stock A, Stock C, and Stock D solutions are mixed to form a homogenous solution containing the desired concentration of the metal salt and the desired RH. The solutions are preferably mixed at room temperature. Microbubbles may appear if the Stock D solution is added to the aqueous solution but the solution becomes clear after mixing for about a minute. All concentrations are determined relative to the incubation solution. It is also possible to prepare the incubation solution by dissolving the salt in a mixture of the water and solvent.

The solution is sealed in a container and incubated for the desired length of time at the desired temperature. Stirring or mixing is not required. The time and temperature of incubation can be predetermined or the process can be monitored until the desired product is achieved. Monitoring can be visually or by other means, such as dynamic light scattering (DLS). The product is typically a milky-white suspension which can be collected by centrifugation or other means.

Stock B solution can be added before or after the incubation, or both, to achieve the desired concentration of dispersant. The volume of Stock B should be taken into account when determining how much of the other stock solutions to add to achieve the desired metal salt concentration and RH.

Neutralization of the incubation solution after the incubation may be preferred in some cases to stabilize the product and help minimize dissolution of the product. The neutralizing agent can be added dropwise to the solution after it is cooled down to room temperature.

The collected slurry or gel can be washed, if desired, with deionized water.

Resolution of Chemical Instability and Colloidal Dispersion Issues

One of the interesting and also significant phenomenon that can occur during the mixed-solvent synthesis is particle dissolution in the incubated mixture after the temperature of the mixture is cooled down to room temperature or during the slurry or gel drying process (with the evaporation of alcohol from the slurry or gel). Both temperature decrease and alcohol evaporation contribute to the increase of the dielectric constant in the liquid around particles and, thus, the chemical instability of particles. Note that the higher dielectric constant of the medium corresponds to the higher solubility of salt in the medium. Fusion or agglomeration between microspheres is due to the partial dissolution of particles during cooling or drying.

If the RH ratio is low (such as 1/1) and the solution is aged at a short t and low T, the solid microsphere particles formed in the incubated mixture may be slowly dissolved back into the mother solution due to the increase of the dielectric constant after the mixture is cooled down. The milky suspension will turn into a completely clear solution after remaining for a long enough period at room temperature.

Under higher RH (such as 5/1) the microspheres may be chemically stable in the mother solution at room temperature. However, if they are not aged enough (if t is short), the particles in the slurry are similarly partially dissolved or totally dissolved during the drying process, depending on the solid fraction in the particle slurry. It is important to note that the chemical instability phenomenon during drying can be favorably utilized in the fabrication of films and coatings via a sol-gel approach.

Neutralization

For the purposes of producing chemically stable ultrafine powders from sol particles or, in some cases, gel materials, the above-described dissolution phenomenon needs to be minimized. One way to minimize dissolution is neutralization of the incubation solution, such as with ammonia. Ammonia neutralization procedures have been previously used for chemical stabilization of oxide particles. Moon, Y. T. et al. *J. Am. Ceram. Soc.* 78, 1103 (1995). Ammonia neutralization is not required if the sol particles are aged enough under appropriate incubation conditions. The key factors that contribute to the aging of produced sol particles are: longer incubation time, higher incubation temperature, larger RH, and higher salt concentration. Well-aged sol particles will not dissolve during a slurry drying process on a substrate. However, in some cases it may be preferable to use conditions adverse to aged particles and to use neutralization.

Addition of Dispersant

Another way to minimize dissolution is addition of a dispersant material such as hydroxypropyl cellulose. The dispersant is added before or after the incubation, or both. For purposes of monodispersed powder production, ideally each individual microsphere should exist separately with no sticking (by neck formation between two microspheres) or aggregating (by colloidal interaction forces). Particle dispersion can be increased by adding a dispersant (such as HPC) to the solution either before or after the incubation. The use of HPC dramatically improves the colloidal stability of sol particles in the product suspension, resulting in dried powders that are well dispersed and segregated.

Other Factors Contributing to Particle Stability

The RH ratio can be adjusted for fine-tuning the morphology and microstructure of the final product. A high RH ratio assists in production of better dispersed primary microsphere particles. However at low RH conditions, long aging time can help to avoid the dissolution of precipitated particles. HPC at $2.0 \times 10^{-3}$ g/cm$^3$ did not seem to have any effect on dispersing the gelly aggregates formed at low RH into individual primary particles. In fact, for purposes of gel network production for sol-gel coatings there is no need for addition of HPC. Gel formation in mixed solvent systems is illustrated in the examples.

Using a higher incubation temperature and a sufficiently long incubation time produces chemically stable materials. At a enough high temperature (120° C.), ultrafine particles (rather than gels) are obtained even at low RH (1/1) conditions. The particle size at low RH (1/1) conditions was smaller than that at high RH (5/1) conditions, about 100 nm and 200 nm, respectively. For sol-gel processing (particularly gel formation), there is no need for such high temperatures.

Sol-Gel Processing

Sol-gel processing refers to homogenous nucleation and growth of a sol or polymer in a liquid medium which forms a uniform powder or gel after drying. Not all collections of sol particles will gel. The gelation of a colloidal suspension (sol) is a phenomenon according to which particles aggregate and form a very open solid network in a continuous liquid phase called a gel.

These methods open up great opportunities for the development of various advanced coatings or films via sol-gel processing, in addition to the ability to obtain high quality ultrafine particles by the methods. The following microstructural factors were controlled by the method: (1) the state of the precipitated material: sol particles or gel; (2) monodispersity of ultrafine particles; (3) particle size; (4) particle morphology; (5) aggregation state of discrete particles; and (6) connectivity between particles that are in a porous gel network.

The results of Example 10 below demonstrate the capability of the method of achieving the full range of sol and gel processing in inorganic metal salt solutions of mixed alcohol-water solvent. In some sense, the mixed solvent system with inorganic metal salt can be an alternative or analog system to the most commonly used but expensive alkoxide system for the purpose of sol-gel synthesis of advanced materials.

The level of HPC present in the starting incubation solutions significantly affects the microsphere particle size. The presence of HPC helped achieve monodispersity of the produced particles. Further, the higher the level HPC present in the incubation solution, the smaller the particles produced.

Besides the morphological effect, real-time DLS data (FIG. 2) showed that HPC may also affect nucleation and growth kinetics during incubation. In DLS spectra, the induction period is indicated by the initial phase before the particless are large enough to be measured. The growth phase is indicated by the increase in particle size, before the gelling point. The point at which the particles exist as a stable sol is indicated by a relatively flat portion before the gelling point, if there is one. The gelling point is indicated by a steep upturn in the curve, followed by the gelling phase indicated by rapid increase in effective hydrodynamic size.

Increasing the level of HPC in the starting solution shortens the induction period before nucleation, and colloidal sol particles grow faster and gel sooner. When the HPC level is above $4.0 \times 10^{-3}$ g/cm$^3$, the further increase of HPC concentration enhances the growth rate and the particle size before the gel network formation but does not change the gelling point (i.e. the time when the dramatic agglomeration or particle connection occurred). This may indicate that a higher level of HPC can maintain the dispersion and colloidal stability of larger particles. Finally, after the incubation stage, the addition of HPC (if needed) only serves to help the steric dispersion of colloid particles that have been formed but does not affect any particle nucleation and growth.

The RH ratio is the most important parameter that determines the morphology of the product. At high RH conditions (such as 5/1), well-dispersed, uniform-size, ultrafine (from nanometer to submicron), dense microsphere particles/powders can be successfully synthesized. As a general rule, the more aged particles have a higher density. Conditions of higher RH ratio, higher initial salt concentration, longer incubation, and higher incubation temperatures are favorable for producing a better aged material. Under low RH (such as RH 1/1) conditions, either less-dense, soft particles or bulk gel materials (in the form of aggregates and agglomerates or particle network) can be produced. Depending on the particle size and connectivity between particles, a material synthesized at low RH can be an opaque gelly material with particles agglomerated/stuck together, a milky white uniform gel with particles fused together forming a porous network, or a relatively clear gel with a dense gel network consisting of nanometer-size primary particles.

Initial inorganic salt concentration significantly affected the size of the particles as powders or the size of building-block particles in the gel materials. There was a clear trend that by decreasing the initial salt concentration, the particle size becomes smaller. HPC level during the incubation also affects and can assist in controlling the particle size.

Achievement of Room-Temperature Processing

Room-temperature sol-gel processing was achieved using an inorganic salt as molecular precursor, thus eliminating high-temperature and energy (electrical or thermal) needs and decreasing operating cost tremendously. Room-temperature processing is demonstrated in Examples 11 and 12 below.

At high RH conditions, nanosized powders can be produced. With decreasing initial salt concentration, the primary particle size becames smaller. An isopropanol washing procedure and addition of HPC can prevent the total dissolution of sol particles during the sample drying process, to produce dispersed, monosized, ultrafine (less than 200 nm) dry powders.

Real Time DLS Studies of Process Parameters

Different process conditions correspond to different characteristic particle growth curves. Under some high RH conditions, there is only stable sol particle formation in the mixed solutions. A growth curve of such conditions shows an S shape, see FIG. 4. The particles go through an induction period (during which particle size smaller than a few nanometers could not be detected by light scattering), growth period, and then reach a final plateau of stable-size sol particles. Each individual colloidal sol particle exists independently in the mixed solution. The S-growth process eventually gives a well-dispersed powder product after the sol/suspension is dried.

Under other low RH conditions, the eventual product is a gel, although the process also goes through a transient sol-formation stage. During the gel-forming process, there are strong interparticle interactions (via particle aggregation/sticking and agglomeration) or network formation (via particle fusion or inter-particle neck formation). The growth curve of a gel-forming process could have either J shape or S-J shape (FIG. 5), corresponding to the absence or the presence of HPC, respectively, in the mixed solutions.

Figure 5:
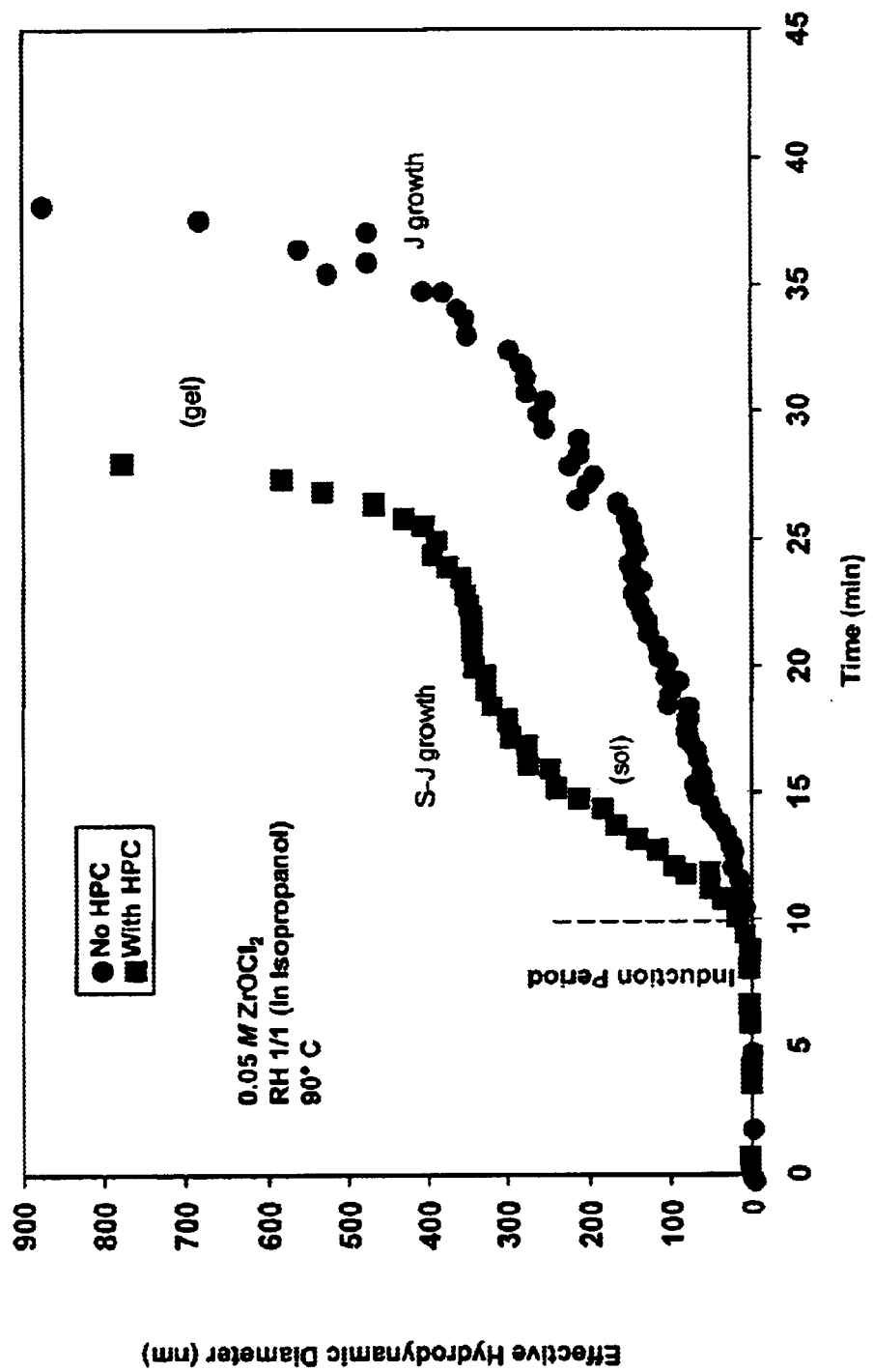
FIG. 5 is a graph of DLS measurements showing a J-shaped growth curve and a S-J-growth curve corresponding to the presence and absence of HPC. The conditions of the example giving the J shape were (C) of 0.05 M, RH of 1/1, and T of 90° C. The conditions for the example giving the S-J shape were the same except $2.0 \times 10^{-3}$ g/cm$^3$ of HPC was added.

Role of HPC. As discussed previously, the presence of HPC changes the way the particles grow with time. When the RH is low, the sol-gel growth curve shifts from a J shape to a S-J shape due to the addition of HPC (FIG. 5). Also, the presence of HPC seems to enhance the nucleation and growth rate, and thus the process reaches the gelling point earlier (FIG. 5). The HPC molecules may serve as a nucleus for particles to grow.

In processes for stable sol formation (such as under high RH 5/1 conditions), the final colloidal particle size can be controlled by adjusting the level of HPC in the mixed solution during incubation. The higher the HPC concentration, the smaller the final particle size.

Effect of initial salt concentration. When the salt concentration level is lower, shorter induction periods, faster particle-growth kinetics, and earlier gelling points are observed (FIG. 6). This might be explained by species existing in starting solutions of different pH. The pH of a lower salt concentration solution is higher. At higher pH, the species may be larger oligomers (such as octamers) rather than tetramers. Larger oligomeric species have lower solubility (and possible faster polymerization rates), and thus, clusters/particles grow faster under incubation.

Figure 7:
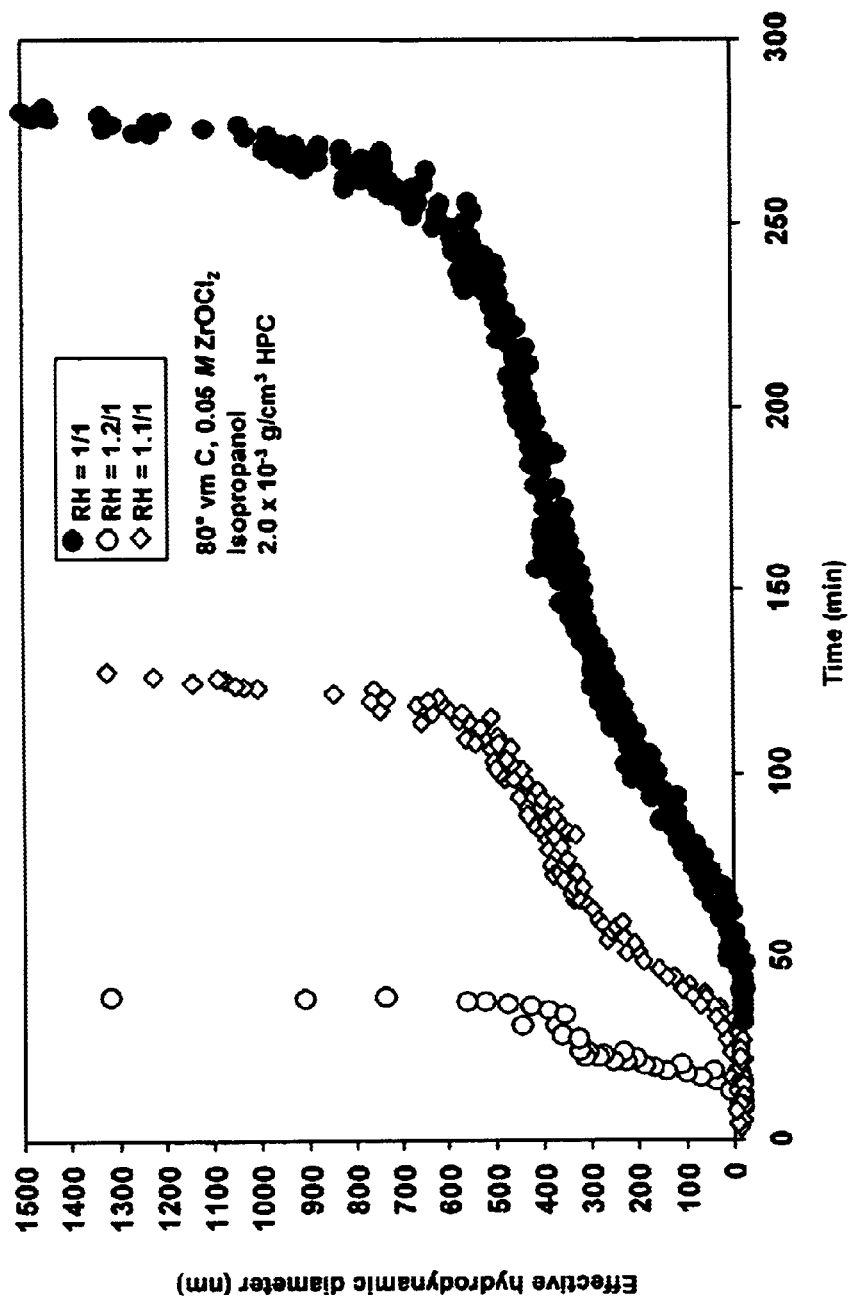
FIG. 7 is a graph of DLS measurements illustrating the effect of RH ratio on particle growth. (C) was 0.05 M, RH was 1/1 (solid circles), 1.1/1 (open diamonds), or 1.2/1 (open circles), T was 80° C., and HPC was used at $2.0 \times 10^{-3}$ g/cm$^3$.

Effect of RH ratio. Increasing the RH ratio enhances the overall rate. Such samples have a shorter induction period, higher particle growth rate, and reach the gelling point earlier (FIG. 7).

Effect of incubation temperature. As shown in FIG. 8, in the absence or presence of HPC, higher temperatures provide faster process kinetics.

IV. Methods of Using the Compositions

The methods described herein can be used in the simple, efficient and cost-effective production of sols and gels, including nanosize particles. The sol-gel processing methods can be used to make a wide range of different products for various applications.

Such sols and gels can be used in the production of materials such as fibers, powders, porous solids, coatings, films, inorganic membranes, and monolithic glasses, and articles incorporating such materials. Advanced ceramic products can be made with the sols and gels.

The applications for sol gel-derived products are numerous. Powders and thin films can be used for electronic, optical, and electro-optic components and devices, such as substrates, capacitors, memory devices, IR detectors, and waveguides. Optical and refractory fibers can be made, for use in fiber optic sensors and thermal insulation. Antireflection coatings can be made for use in automotive and architectural applications. Glass monoliths and inorganic/organic hybrids can be made for use in, for example, lenses, mirror substrates, graded index optics, optical filters, sensors, passive and nonlinear active waveguides, and lasers.

Sol-gel processes produce coatings and films that exhibit unique properties suitable for various applications. The gels produced can be precursors for sol-gel coating processes and film formation.

The chemical instability phenomenon during drying can be favorably utilized in the fabrication of films/coatings via a sol-gel approach. Formation of such films/coatings is known to those skilled in the art.

Organic molecules can be incorporated into sol-gel products through encapsulation or bonding.

The invention is further illustrated by the following examples, which are not to be construed in any way as imposing limitations upon the scope thereof. On the contrary, it is to be clearly understood that resort may be had to various other embodiments, modifications, and equivalents thereof, which, after reading the description herein, may suggest themselves to those skilled in the art without departing from the spirit of the present invention.

EXAMPLES

Experimental Methods

The experimental techniques that were used included scanning electron microscope (SEM) (Joel JSM- T220A) for determination of particle size and morphology. Appropriate SEM techniques are known to those skilled in the art. For SEM and high-temperature X-ray diffraction (HTXRD) analysis, the paste-like slurry or gel material was dropped onto a SEM sample stub and dried at room temperature. The dried powder or gel was coated with gold in an Argon plasma sputterer and then investigated by SEM.

Real-time dynamic light-scattering (DLS) was used for studying particle evolution and growth kinetics and other process characteristics. An appropriate DLS technique is described in Hu, M. Z.-C. et al., *J. Colloid Interface Sci.* 198:87–99 (1998).

In-situ high-temperature X-ray diffraction (HTXRD) was used for investigating the material microstructure including crystallization during calcination and phase transformation. An appropriate HTXRD technique is described in Hu, M. Z.-C. et al., *J. Am. Ceram. Soc.* (in press (1999))

Materials

Stock solutions were prepared in advance and stored at room temperature (22 to 25° C.). The stock solutions include the following:

(A) Stock A—aqueous solution of inorganic salt (2.0 M) ($ZrOCl_2 \cdot H_2O$, 99% purity from EM Science, Gibbstown, N.J.);

(B) Stock B—aqueous solution of hydroxypropyl cellulose, about 100,000 molecular weight, 0.1 g/ml (prepared at 0° C. to help faster HPC dissolution);

(C) Stock C—doubly distilled, deionized water; and (D) Stock D—water-miscible alcohol such as 99.9% isopropanol.

Abbreviations

In the examples, (C) refers to molar concentration of $ZrOCl_2$, RH refers to volume ratio of alcohol to water, where a 1/1 ratio is 50% alcohol; (T) refers to incubation temperature in ° C., (t) refers to incubation time in minutes or hours, as designated, and (HPC) refers to hydroxypropyl cellulose concentration in grams per cubic centimeter ($g/cm^3$).

General Method

The general scheme of the method used for the examples is illustrated by FIG. 1. Stock A solution, Stock C solution, and Stock D solution were mixed together to form a homogenous solution containing the desired concentration of $ZrOCl_2$ and the desired RH. Microbubbles appeared when the Stock D solution was added to the aqueous solution but the solution became clear after mixing for about a minute. Stock B solution can be added before or after the incubation to achieve the desired concentration of HPC. The volume of Stock B should be taken into account when determining how much of the other stock solutions to add to achieve the desired concentrations. All concentrations are determined relative to the incubation solution.

The solution was sealed in a container and incubated for the desired length of time at the desired temperature, without stirring or mixing. The product was typically a milky-white suspension that was collected by centrifugation. The centrifugation speed needed to collect the solids will depend upon the particle size and can be determined by one skilled in the art. Typically, the speed will be about 5000 to 25,000 rpm. The paste-like slurry or gel material was dropped onto a SEM sample stub and dried at room temperature. The dried powder or gel was coated with gold in an Ar plasma sputterer and then investigated by SEM. In some cases, a dilute slurry or gel sample was used for further analysis. In other cases a concentration sample was used.

Neutralization of the incubation solution after the incubation may be preferred in some cases to stabilize the product and help prevent dissolution of the product. 5N $NH_4OH$ can be added dropwise to the solution.

Resolution of Chemical Instability and Colloidal Dispersion Issues

Example 1

Low RH, no HPC

The general scheme described above was followed. (C) was 0.05 M $ZrOCl_2$, RH was 1/1, T was 90° C., and t was 18 hours. The particles were perfect microspheres but were not monodispersed. The particles were large-ranging from about 1 to 5 microns. The majority of particles were connected/fused together, with neck formation between particles.

Example 2

High RH, No HPC, Short Incubation Time

The same procedure was followed: (C) was 0.1 M, RH was 5/1, T was 100° C., and t was 1 hour. Concentrated particle slurry was collected by centrifugation and dropped on the stub surface for drying. Sol particles were totally dissolved on the surface of the SEM stub during drying when relatively diluted sol or small quantity of relatively thick sol was dropped on the stub surface. However, internal sol particles were not much dissolved and still retained the integrity of the spherical shape.

Example 3

High RH, Addition of HPC, Short Incubation Time

The same procedure was followed except $2.0 \times 10^{-3}$ $g/cm^3$ HPC was added before the incubation: (C) was 0.1 M, RH was 5/1, T was 100° C. and t was 1 hour. Drying of sol with low solid particle fraction caused complete dissolution of sol particles. Partial surface sol particle dissolution happened during drying of concentrated slurry. Compared with Example 2, a lower amount of surface particle dissolution was observed. Particles at the sample surface only partially fused together.

Example 4

Low RH, Addition of HPC, Short Incubation Time

The same procedure was followed except $2.0 \times 10^{-3}$ g/cm$^3$ HPC was added before the incubation: (C) was 0.1 M, RH was 1/1, T was 100° C. and t was 1 hour. The particles produced at low RH were less dense than those produced under high RH conditions and were gelly-like. Upon visual inspection, the dried sample on the SEM stub surface looked like a partially transparent flake layer. The SEM photo showed the aggregated particles being less spherical as compared with those produced at high RH conditions (Example 3). The partial dissolution or "sticky" particle surfaces may be responsible for the fusion between spheroidal particles.

Example 5

Longer Incubation Time, Low RH, No HPC

The same procedure was followed: (C) was 0.1 M, RH was 5/1, T was 100° C. and t was 41 hours. White discrete microspherical powders were seen on the stub surface after drying. Because of the lack of HPC in the mixture and thus the poor colloidal dispersion, the powders were aggregated (or even fused) microspheres. There was relatively large primary microspherical particle size distribution. However, no obvious particle dissolution was observed.

Example 6

Longer Incubation Time, High RH, Addition of HPC

The same procedure was followed except $2.0 \times 10^{-3}$ g/cm$^3$ HPC was added before the incubation: (C) was 0.1 M, RH was 5/1, T was 100° C. and t was 41 hours. High quality ultrafine (about 200 nm), monodispersed, well-dispersed microsphere powders were used. The long incubation time helped maintain the chemical stability (integrity of particle size and shape) during drying. The HPC aided the colloidal dispersion between microspheres. The high RH ratio condition produced dense microsphere particles. No ammonia neutralization was needed to chemically stabilize the microspheres during drying.

Example 7

Longer Incubation Time, Low RH, Addition of HPC

The same procedure was followed: (C) was 0.1 M, RH was 1/1, T was 100° C. and t was 41 hours. The low RH ratio dramatically changed the morphology of the particle and the microstructure of the final product, as compared to Example 6. The product was gelly aggregates that were not dispersed into individual particles by the HPC. The particles were not dissolved, indicating that the longer incubation time, as compared to Example 4, stabilized the precipitated materials.

Example 8

Higher Incubation Temperature, Low RH

The same procedure was followed: (C) was 0.1 M, RH was 1/1, T was 120° C. and t was 24 hours. The higher incubation temperature and intermediate incubation time produced chemically stable materials. No sample dissolution was observed during drying, and thus there was no need of ammonia neutralization treatment after the incubation.

At this higher temperature, as compared to Example 7, ultrafine particles (rather than gels) were obtained even at the low RH (1/1) conditions.

Example 9

Higher Incubation Temperature, High RH

The same procedure was followed: (C) was 0.1 M, RH was 5/1, T was 120° C. and t was 24 hours. The higher incubation temperature and intermediate incubation time produced chemically stable materials. No sample dissolution was observed during drying, and thus there was no need of ammonia neutralization treatment after the incubation.

Ultrafine particles (rather than gels) were obtained. The particle size at low RH condition was smaller than at high RH conditions, about 100 nm and 200 nm, respectively.

Sol-Gel Processing

Example 10

HPC Addition

This example compared the effects of different levels of HPC in the incubation solution and addition of HPC to the post incubation solution. The example also compared the effect of HPC on formation of ultrafine sol particles (by having higher RH of 5/1) and on gel network formation (lower RH of 1/1). The general method was followed, with the conditions shown in Table 2. In one set of samples, the HPC concentration in the incubation solution was very low ($2.0 \times 10^{-4}$ g/cm$^3$). After the incubation and ammonia neutralization, HPC concentration was raised to $2.0 \times 10^{-3}$ g/cm$^3$. In another set of samples, the HPC concentration in the incubation solution was relatively higher ($2.0 \times 10^{-3}$ g/cm$^3$) and no additional HPC was added. This set was also neutralized by ammonium.

The structure of the resulting sols and gels was examined by SEM. The size and morphology of the particles was noted. "Gelly" particles refers to those that were opaque. "Gel" particles refers to those that are partially transparent. "Nanogel" refers to those structures that appeared to be essentially a clear "polymeric gel".

TABLE 2

Conditions for Example 10

|  | (C) (M) | RH | T (° C.) | t (hrs) | HPC | Resulting structure |
|---|---|---|---|---|---|---|
| 10A | 0.167 | 5/1 | 100 | 3 | low initial, more added | microsphere sol particles, about 2 μm, dispersity less than 15% |
| 10B | 0.1 | 5/1 | 100 | 3 | low initial, more added | microsphere sol particles, about 1 μm, dispersity less than 10% |
| 10C | 0.05 | 5/1 | 100 | 3 | low initial, more added | microsphere sol particles, about 120 nm, dispersity less than 10% |
| 10D | 0.167 | 1/1 | 100 | 3 | low initial, more added | gelly, about 2.5 μm, primary particle dispersity less than 15% |
| 10E | 0.1 | 1/1 | 100 | 3 | low initial, more added | gel, about 1 μm, primary particle dispersity less than 10% |

TABLE 2-continued

Conditions for Example 10

| | (C) (M) | RH | T (° C.) | t (hrs) | HPC | Resulting structure |
|---|---|---|---|---|---|---|
| 10F | 0.05 | 1/1 | 100 | 3 | low initial, more added | very clear gel, less than 100 nm, primary particle dispersity less than 10% |
| 10G | 0.167 | 5/1 | 100 | 3 | high initial | microsphere sol particles, about 300 nm, dispersity less than 5% |
| 10H | 0.1 | 5/1 | 100 | 3 | high initial | microspheroid particles, about 150 nm, dispersity less than 5% |
| 10I | 0.05 | 5/1 | 100 | 3 | high initial | nanosol particles, about 50 nm, dispersity less than 10% |
| 10J | 0.167 | 1/1 | 100 | 3 | high initial | gelly, about 5 $\mu$m, primary particle dispersity less than 10% |
| 10K | 0.1 | 1/1 | 100 | 3 | high initial | gel, about 1 $\mu$m, primary particle dispersity less than 5% |
| 10L | 0.05 | 1/1 | 100 | 3 | high initial | nanogel, less than 100 nm, primary particle dispersity less than 5% |

The amount of HPC present in the incubation solutions significantly affected the microsphere particle sizes. Those samples having higher HPC in the initial solutions produced smaller particles (Examples 10D, E, and F). The presence of HPC in the initial stages helped in obtaining monodispersity of the produced particles (the monodispersity of Examples 10G through 10L was greater than that of Examples 10A through 10F). The particles from Examples 10G through 10I were smaller than those of Examples 10A through 10C.

Figure 2:
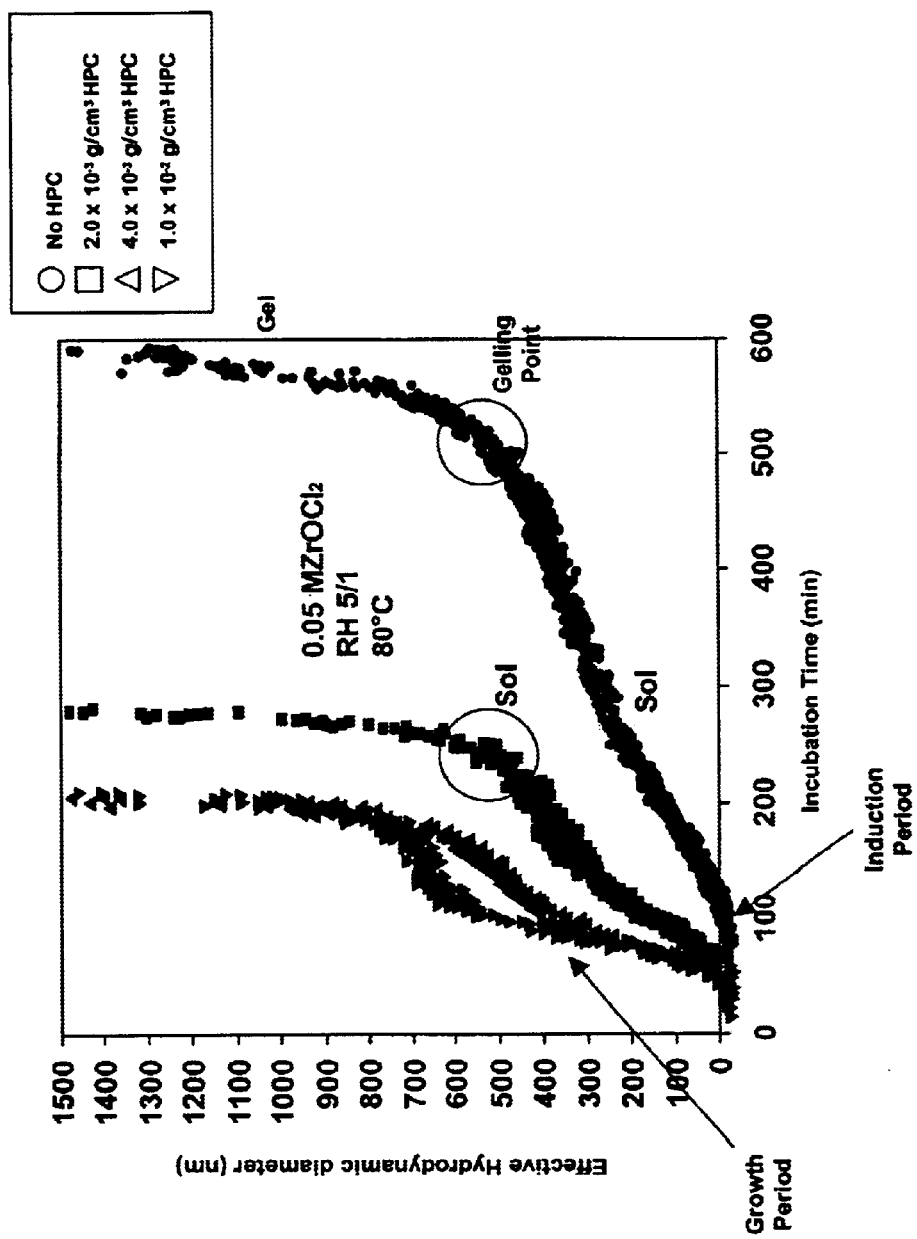
FIG. 2 is a graph of dynamic light scattering (DLS) measurements showing the effect of HPC on the nucleation and growth of solid phase particles. (C) was 0.05 M, RH was 5/1, T was 80° C., and (HPC) was $1.0 \times 10^{-2}$ g/cm$^3$ (open inverse triangles), $4.0 \times 10^{-3}$ g/cm$^3$ (open triangles), $2.0 \times 10^{-2}$ g/cm$^3$ (open squares), or zero (open circles).

Real-time DLS data, illustrated by FIG. 2, showed that HPC also affected the nucleation and growth kinetics during incubation. Increasing the level of HPC in the starting solution shortened the induction period and colloidal sol particles grew faster to reach the gelling points. When the HPC level was above $4.0 \times 10^{-3}$ g/cm$^3$, the further increase of HPC concentration increased the growth rate and the particle size before the gel network formation, but did not change the gelling point (when the dramatic agglomeration or particle connection occurred). After the incubation, addition of HPC is needed only for the steric dispersion of colloid particles that have been formed.

RH ratio was the most important parameter that controlled the morphology of the product. At the higher RH conditions, well dispersed uniform-size ultrafine (from nanometer to submicron) dense microsphere particles/powders were synthesized.

As a general rule, the more aged particles had higher density. Higher RH ratio, higher initial salt concentration, longer incubation, and higher incubation temperature all contributed to a better aged material. Under low RH (such as RH 1/1) conditions, either less-dense, soft particles or gel materials (in the form of aggregates and agglomerates or networks) were produced. The particle surface were rough and dented because of the shrinkage during drying for SEM sample preparation. Also, the particle surfaces were "sticky" (even in the presence of a dispersant like HPC) in that particles stuck together or fused together by forming a connection "neck" between particles. Depending on the particle size and connectivity between particles, the materials synthesized at low RH were a gelly agglomerate material, milky white uniform gels, or clear gels.

Initial inorganic salt concentration significantly affected the size of the particles as powders or the size of building-block particles in the gel materials. Example 10 illustrated the clear trend that decreasing the initial salt concentration decreased the particle size. It should be noted that controlling the HPC level also helps to control the particle size.

Room-Temperature Processing

Example 11

The same general procedure was followed. The conditions are illustrated by Table 3.

TABLE 3

Conditions for Example 11.

| SAMPLE | (C) (M) | RH | T (° C.) | t (hours) | HPC (g/cm$^3$) | particle size, dispersity |
|---|---|---|---|---|---|---|
| 11A | 0.2 | 5/1 | 22 | 10 | $2.0 \times 10^{-3}$ | about 150 nm, less than 5% |
| 11B | 0.1 | 5/1 | 22 | 30 | $2.0 \times 10^{-3}$ | about 100 nm, less than 5% |
| 11C | 0.05 | 5/1 | 22 | 60 | $2.0 \times 10^{-3}$ | about 50 nm, less than 5% |

The incubation solution became a milky sol for each of examples 11A. 11B, and 11C. The solution was maintained at 22° C. for 2 days, then neutralized to about pH 7.0 by titration with 5N ammonia, and centrifuged for slurry collection. A drop of the slurries was placed on an SEM stub, dried at room temperature, coated with gold, and investigated under the SEM. The primary particle size became smaller with decrease in the initial salt concentration. The samples from 11B and 11C were nanosize dry powders. Larger sized microspheroids consisting of nanosized primary particles were produced in Example 11A.

Example 12

The same method as Example 11A was followed. However, after the solution sat at room temperature for 2 days, the milky sol was collected by centrifugation and subjected to various treatments. In Example 12A, the slurry was washed once with isopropanol (50 ml) and the bottom slurry was collected for SEM observation. In Example 12B, a suspension of the slurry in isopropanol was neutralized with ammonia and the bottom slurry was collected for SEM observation. In Example 12C, HPC was added to the ammonium neutralized suspension of Example 12B at $2.0 \times 10^{-3}$ g/cm$^3$ and the slurry was collected for SEM.

The isopropanol washing procedure prevented the total dissolution of sol particles during sample drying, but the particles were fused/agglomerated together. Ammonia neutralization of the particle suspension in isopropanol did not show significantly decrease the agglomeration after sample drying. However, addition of HPC after the neutralization step produced dispersed, monosized, ultrafine (less than 200 nm) dry powders. With the procedure used in this example, room temperature production of monodispersed ultrafine particles was achieved.

Example 13

Kinetics of Conversion of Inorganic Molecular Precursors to Sol-Gel Product

Figure 3:
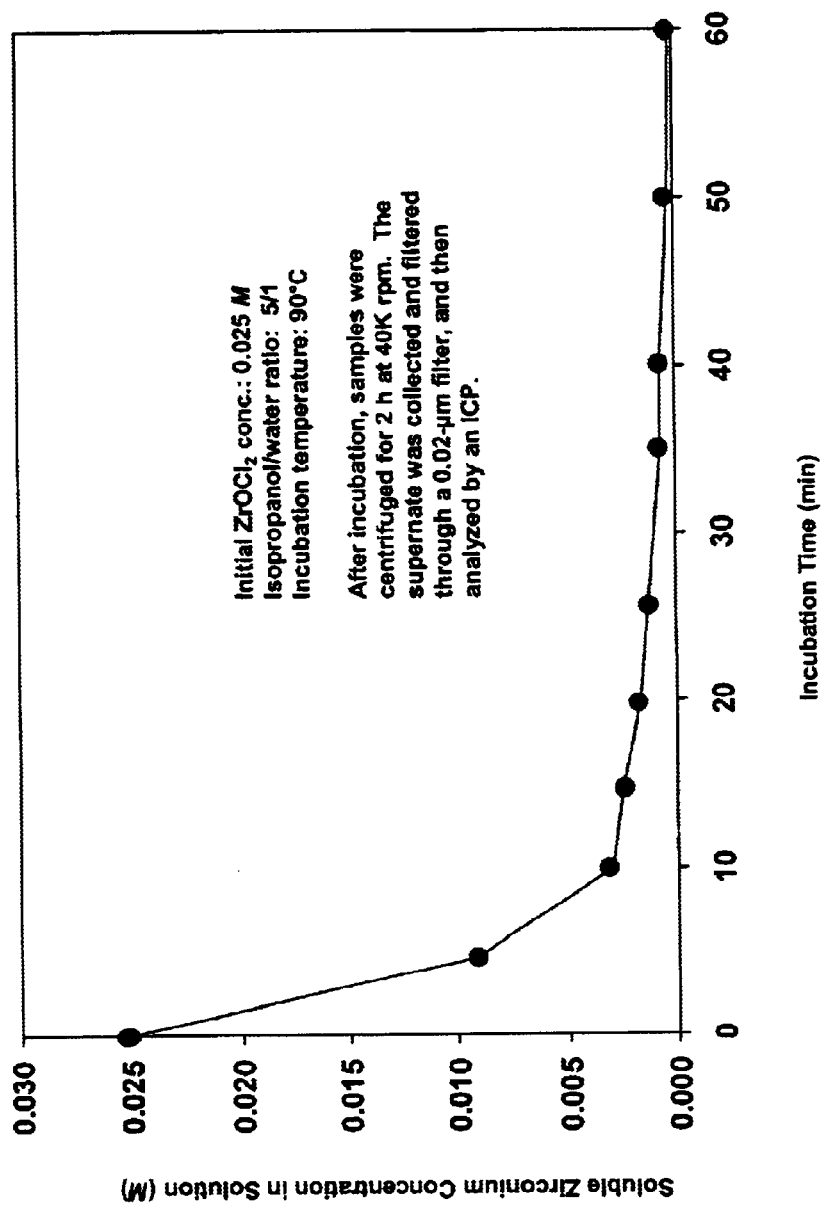
FIG. 3 is a graph illustrating the kinetics of the conversion of soluble zirconium species into solid colloidal particles in a mixed solution. (C) was 0.025 M, RH was 5/1, and T was 90° C.

An inductively coupled plasma (ICP) spectrometer was used to monitor the concentration of soluble zirconium species in solution during incubation. The process was carried out as described above: (C) was 0.025 M, RH was 5/1, T was 90° C. After incubation, samples were centrifuged for 2 hours at 40,000 rpm. The supernatant was collected and filtered through a 0.02 micron filter, and then analyzed by ICP. Near complete conversion (from soluble zirconium species into a solid sol-gel product) was achieved in approximately 1 hour (see FIG. 3). The conversion kinetics depends on the conditions. For example, visual examination and measurement with a stopwatch determined that at high initial salt concentration and high RH conditions, the mixed solution turned turbid almost instantly (at elevated temperatures) or in a few minutes (at room temperature).

DLS Studies

Real-time DLS was used to study the mixed solvent sol-gel synthesis process. Different characteristic particle growth curves were found for different process parameters.

Example 14

Effect of HPC

With other conditions (such as low RH), the eventual product was a gel although the process went through a transient sol-formation stage. During the gel-forming process, there were strong inter-particle interactions (via particle aggregation/sticking, agglomeration) or network formation (via particle fusion or inter-particle neck formation). The growth curve of gel-forming processes could have either a J shape or an S-J shape (FIG. 5), corresponding to the absence and presence, respectively, of HPC in the mixed solutions. The conditions of the example giving the J shape were (C) of 0.05 M, RH of 1/1, T of 90° C. The conditions for the example giving the S-J shape were the same except $2.0 \times 10^{-3}$ g/cm$^3$ of HPC was added.

At high RH, similar effects were seen. FIG. 2 shows DLS where (C) was 0.05 M, RH was 5/1, T was 80° C., and (HPC) was $1.0 \times 10^{-2}$ g/cm$^3$ (open inverse triangles), $4.0 \times 10^{-3}$ g/cm$^3$ (open triangles), $2.0 \times 10^{-2}$ g/cm$^3$ (open squares), or zero (open circles).

Example 15

Effect of Initial Salt Concentration

The same general method was used; (C) was 0.05 (filled circles) or 0.025 M (open circles), RH was 1/1, and T was 85, 90, and 95° C., respectively for FIGS. 6A, 6B, and 6C. The Figures illustrate the DLS measurements. The lower salt concentrations, at all three temperatures, exhibited shorter induction periods, faster particles growth kinetics, and reached the gelling point earlier.

Example 16

Effect of RH

Figure 4:
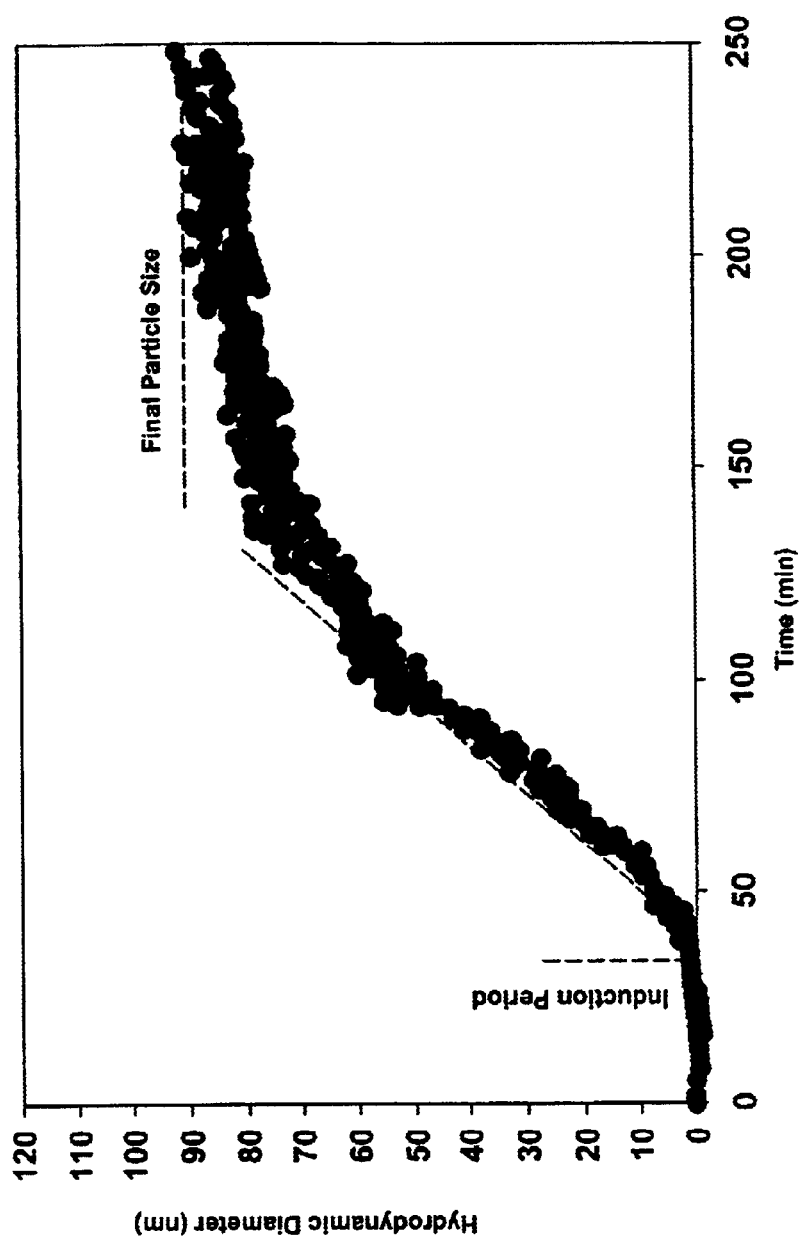
FIG. 4 is a graph of DLS measurements illustrating an S-shaped growth curve during stable sol formation. (C) was 0.05 M, RH was 5/1, and T was 90° C.

Under some high RH conditions there is only stable sol formation in the incubation solution. This example used the same general method, (C) was 0.05 M, RH was 5/1, and T was 90° C. The growth curve had an S shape, as shown in FIG. 4. The S-shaped curve illustrates an induction period (during which particle size smaller than a few nanometers cannot be detected by the light scattering), a growth period, and a final equilibrium to produce stable size sol particles. Each individual colloidal sol particle existed independently in the mixed solution. The S-growth process eventually gave a well dispersed powder product after the sol was dried.

The effect of increasing RH, while maintaining a low RH was studied. The same general method was used and the results are shown in FIG. 7; (C) was 0.05 M, RH was 1/1 (solid circles), 1.1/1 (open diamonds, or 1.2/1 (open circles), T was 80° C., and HPC was used at $2.0 \times 10^{-3}$ g/cm$^3$. Increasing the RH enhanced the overall rate, resulted in a higher particle growth rate and resulted in the samples reaching the gelation point faster.

Example 17

Effect of Incubation Temperature

The same general method was used. In FIG. 8A (C) was 0.05 M, RH was 1/1, and T was 85° C. (filled circles), 90° C. (open circles), 95° C. filled hexagons), or 100° C. (open hexagons). In FIG. 8B, (C) was 0.05 M, RH was 1/1, and T was 80° C. (filled circles), 85° C. (open circles), or 90° C. (filled diamonds), and HPC was used at $2.0 \times 10^{-3}$ g/cm$^3$. Both with and without HPC, higher temperature provided better process kinetics.

Example 18

Effect of Solvent Type

Figure 9:
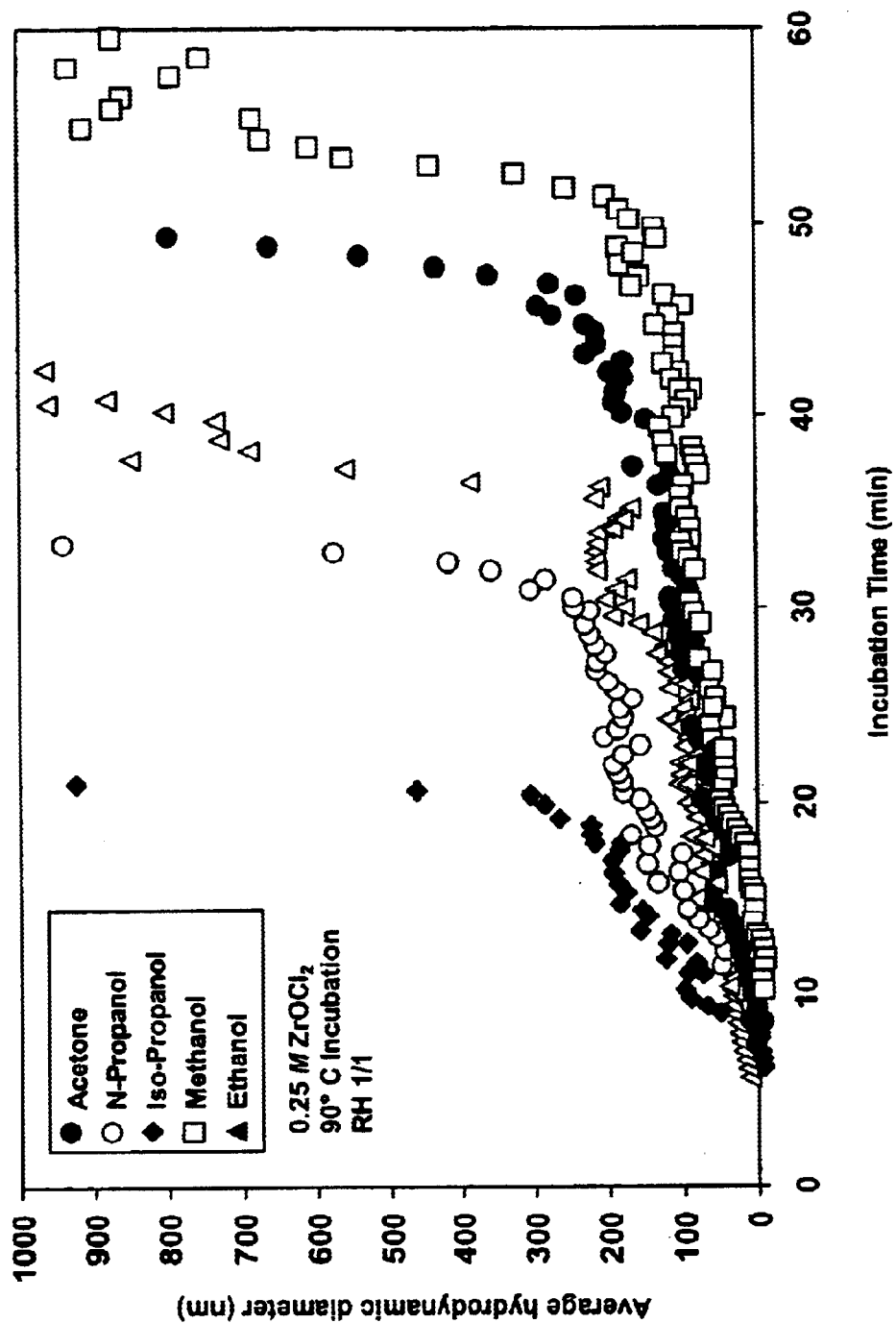
FIG. 9 is graphs of DLS measurements showing the effect of different solvents on particle growth kinetics. (C) was 0.025 M, RH was 1/1, T was 90° C. Different solvents were used: acetone (filled circles), n-propanol (open circles), iso-propanol (filed diamonds), methanol (open squares), and ethanol (open triangles).

The same general method was used; (C) was 0.025 M, RH was 1/1, T was 90° C. The results are shown in FIG. 9. Different solvents were used: acetone (filled circles), n-propanol (open circles), iso-propanol (filed diamonds), methanol (open squares) and ethanol (open triangles). The growth curves for methanol, ethanol, n-propanol, and iso-propanol show that the general trend is that the solvents with lower dielectric constant induced faster sol-gel formation kinetics. In addition, when the growth curve induced by addition of acetone (dielectric constant 20.8 at 25° C.) and n-propanol (20.1 at 25° C.), are compared, it is evident that some reactivity properties in n-propanol must be responsible for the faster growth kinetics.

Example 19

Characterization of "Sol-Gel" Product by HTXRD

Figure 10:
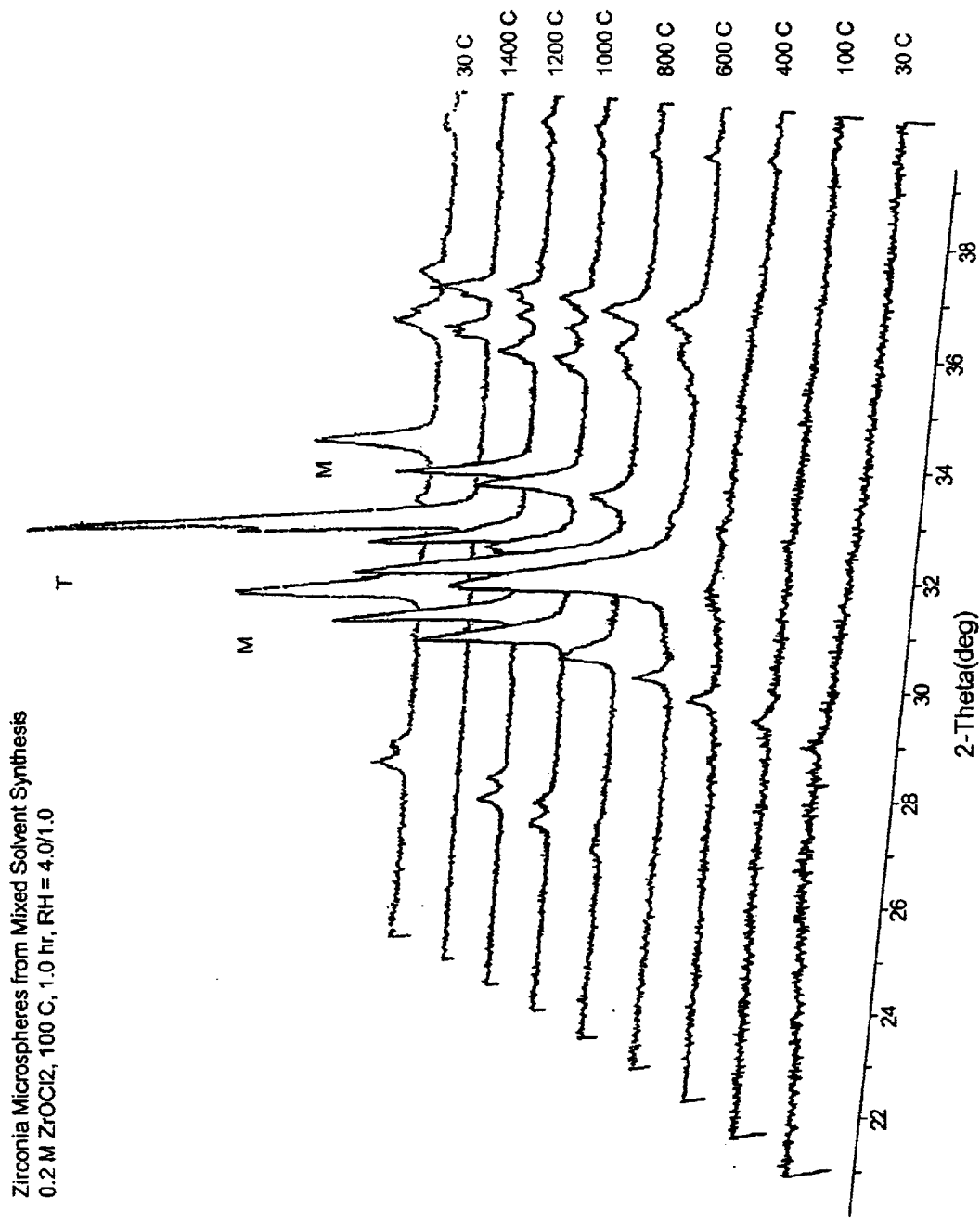
FIG. 10 illustrates HTXRD spectra for less-aged sol-gel materials from mixed solvent synthesis. (C) was 0.2 M, RH was 4/1, T was 100° C. and t was 1 hour.
Figure 11:
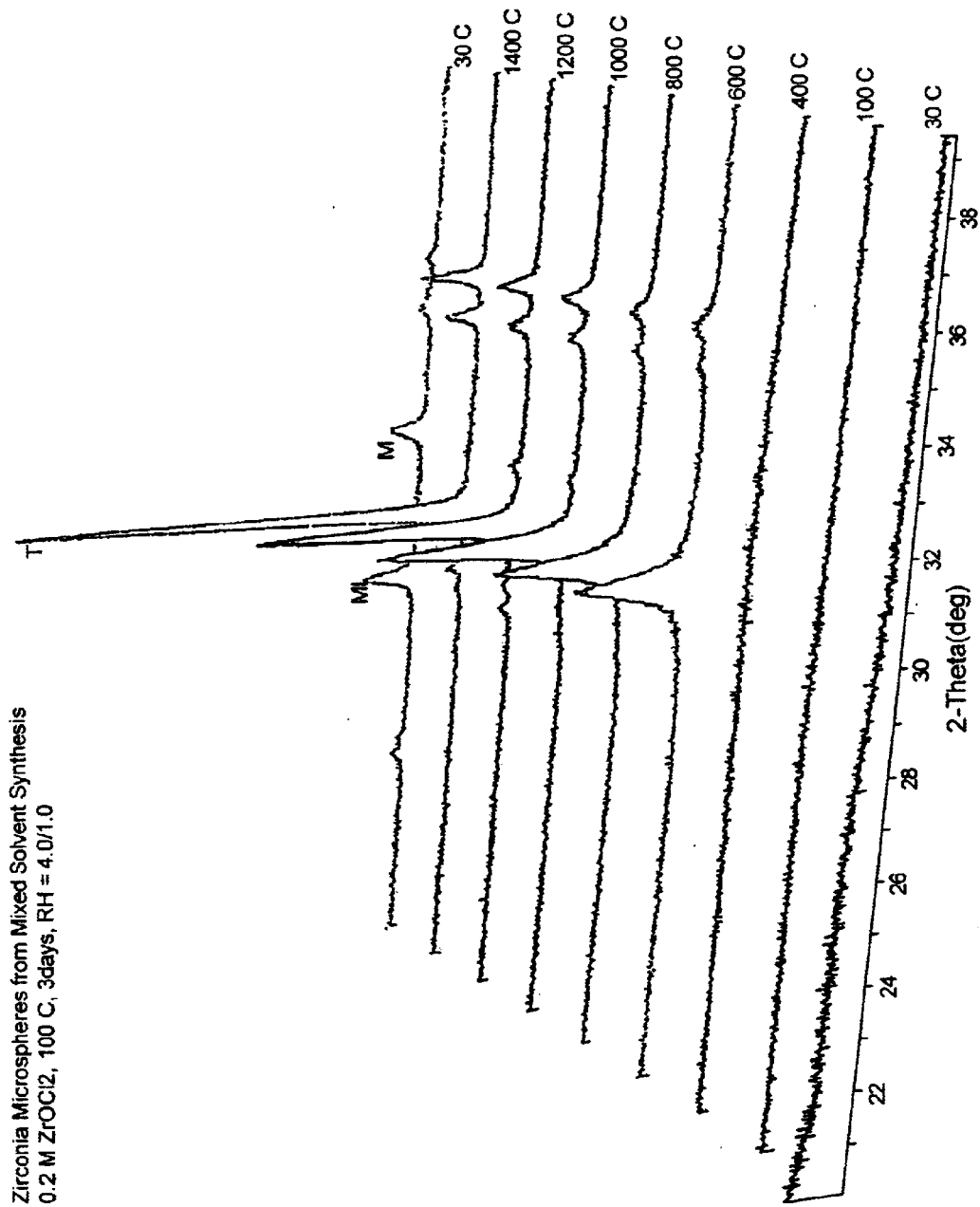
FIG. 11 illustrates HTXRD spectra for well-aged sol-gel materials from mixed solvent synthesis. (C) was 0.2 M, RH was 4/1, T was 100° C. and t was 3 days.

The sol-gel product from the mixed solvent synthesis route is quite different from the one produced by the forced hydrolysis of zirconium salt in alcohol-free aqueous solutions. By HTXRD, the products from the mixed solvent synthesis are amorphous all the time, while the products from the forced hydrolysis are monoclinic. Further, phase transformations of the products from the mixed solvent system depend on the synthesis conditions. For example, the less-aged sample change from amorphous to a phase in which monoclinic and tetragonal crystals coexist, then transformed to pure tetragonal phase at 1400° C. (FIG. 10—(C) was 0.2, RH was 4/1, T was 100° C. and t was 1 hour). In contrast, the well-aged samples started crystallization between 400 and 600° C. and only pure tetragonal phase exists during further crystallization by increasing temperature from 600 to 1400° C. (FIG. 11—(C) was 0.2, RH was 4/1, T was 100° C. and t was 3 days).

The above description is intended to be illustrative and not restrictive. Many embodiments will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references referred to herein, including patents, patent applications, and publications, are incorporated herein by reference.

What is claimed is:

1. A method of sol-gel processing using an inorganic metal salt and a mixed solvent system, comprising:
preparing a solution including an inorganic metal salt, water, and an organic solvent having a metal salt concentration and a volume ratio of organic solvent to water, wherein the inorganic metal salt contains a metal selected from the group consisting of aluminum, hafnium, silicon, zirconium, lanthanum, germanium, tantalum, combinations thereof, and combinations thereof with titanium;
adding a dispersant to the solution; and
incubating the solution at a temperature from about 20° C. to about 25° C. for a period of time;
wherein the metal salt concentration, volume ratio of organic solvent to water, temperature, and time are selected to provide a sol or a gel having desired characteristics;
wherein the sol or the gel is capable of forming a coating;
wherein the volume ratio of organic solvent to water ranges from about 1/1 to 10/1;
wherein nanosized particles are produced; and,
wherein the time ranges from about one minute to about 72 hours.

2. The method of claim 1, wherein the step of preparing the solution comprises:
providing an aqueous solution of an inorganic metal salt;
providing an organic solvent; and,
mixing the inorganic metal salt solution and the organic solvent in proportions so that a desired metal salt concentration and a desired ratio of organic solvent to water are achieved.

3. The method of claim 1 further comprising the step of neutralizing the solution after the incubation.

4. The method of claim 1, wherein the dispersant is added prior to the incubation.

5. The method of claim 1, wherein the dispersant is added after the incubation.

6. The method of claim 1, wherein the organic solvent is selected from the group consisting of methanol, ethanol, isopropanol, n-propanol, tert-butyl alcohol, n-butanol, acetone and glycerol.

7. The method of claim 1, wherein the concentration of inorganic metal salt ranges from about 0.005 M to about 0.5 M.

8. The method of claim 7, wherein the concentration of inorganic metal salt ranges from about 0.025 M to about 0.2 M.

9. The method of claim wherein the ratio of organic solvent to water ranges from about 1/1 to about 5/1.

10. The method of claim 1, wherein a sol is produced.

11. The method of claim 1, wherein the ratio of organic solvent to water ranges from about 1/1 to about 2/1 and a gel is produced.

12. The method of claim 1, wherein monodispersed particles are produced.

13. A method of producing a sol from an inorganic metal salt at room temperature comprising:
preparing a solution including an inorganic metal salt, water, and an organic solvent having a metal salt concentration and a volume ratio of organic solvent to water, wherein the inorganic metal salt contains a metal selected from the group consisting of aluminum, hafnium, silicon, zirconium, lanthanum, germanium, tantalum, combinations thereof, and combinations thereof with titanium;
adding a dispersant to the solution; and,
incubating the solution at room temperature for a period of time;
wherein the metal salt concentration, volume ratio of organic solvent to water, and time are selected to provide a sol having desired characteristics;
wherein the sol is capable of forming a coating;
wherein the volume ratio of organic solvent to water ranges from about 1/1 to about 10/1;
wherein the sol contains nanosized particles; and,
wherein the time ranges from about one minute to about 72 hours.

14. The method of claim 13, further comprising the step of neutralizing the solution after the incubation.

15. The method of claim 13, wherein the organic solvent is selected from the group consisting of methanol, ethanol, isopropanol, n-propanol, tert-butyl alcohol, n-butanol, acetone, and glycerol.

16. The method of claim 13, wherein the concentration of inorganic metal salt ranges from about 0.005 M to about 0.5 M.

17. The method of claim 13, wherein the temperature ranges from about 20° C. to about 25° C.

18. The method of claim 13, further comprising drying the sol to produce a particle powder.

19. A method of producing monodispersed particles at room temperature, comprising:
preparing a solution including an inorganic metal salts, water, and an organic solvent having a metal salt concentration and a volume ratio of organic solvent to water, wherein the inorganic metal salt contains a metal selected from the group consisting of aluminum, hafnium, silicon, zirconium, lanthanum, germanium, tantalum, combinations thereof, and combinations thereof with titanium;
adding a dispersant to the solution; and,
incubating the solution at room temperament for a period of time;
wherein the metal salt concentration, volume ratio of organic solvent to water, and time are selected to provide a sol having desired characteristics;
wherein the sol is capable of forming a coating;
wherein drying the sol to produce a powder of monodisperse particles; and
wherein the volume ratio of organic solvent to water ranges from about 1/1 to about 10/1; and,
wherein the time ranges from about one minute to about 72 hours.

20. The method of claim 19, further comprising the step of neutralizing the solution after the incubation.

21. The method of claim 19, wherein the organic solvent is selected from the group consisting of methanol, ethanol, isopropanol, n-propanol, tert-butyl alcohol, n-butanol, acetone, and glycerol.

22. The method of claim 19, wherein the concentration of inorganic metal salt ranges from about 0.005 M to about 0.5 M.

23. The method of claim 19, wherein the volume ratio of organic solvent to water ranges from about 5/1 to about 10/1.

24. The method of claim 19, wherein the temperature ranges from about 20° C. to about 25° C.

* * * * *